United States Patent [19]
Deguchi et al.

[11] Patent Number: 5,624,544
[45] Date of Patent: Apr. 29, 1997

[54] METHOD AND APPARATUS FOR MANUFACTURING IONIZED WATER

[75] Inventors: Katsuhiko Deguchi, Osaka; Kazunori Osamura, Kanagawa, both of Japan

[73] Assignee: Kabushiki Kaisha Alone World, Tokyo, Japan

[21] Appl. No.: 503,523

[22] Filed: Jul. 18, 1995

[30] Foreign Application Priority Data

Jul. 19, 1994 [JP] Japan ................................. 6-166584

[51] Int. Cl.$^6$ ...................................................... C02F 1/461
[52] U.S. Cl. ........................... 205/742; 205/746; 204/253; 204/260; 204/267; 204/272; 204/296
[58] Field of Search ........................... 204/149, 151, 204/253, 260, 267, 272, 296, 228; 205/742, 746

[56] References Cited

U.S. PATENT DOCUMENTS

| | | | |
|---|---|---|---|
| 4,107,021 | 8/1978 | Okazaki | 204/260 |
| 4,121,991 | 10/1978 | Miller et al. | 204/260 |
| 4,278,524 | 7/1981 | Kadija | 204/252 |
| 4,525,272 | 6/1985 | Henson | 204/228 |
| 4,810,344 | 3/1989 | Okazaki | 204/260 |
| 4,872,959 | 10/1989 | Herbst et al. | 204/149 |

*Primary Examiner*—Arun S. Phasge
*Attorney, Agent, or Firm*—Seed and Berry LLP

[57] ABSTRACT

An ionized water stably maintaining a strong pH value for a long period is manufactured. Plural electrolytic cells disposing cylindrical cathodes and anodes across a cylindrical electrolytic diaphragm with a bottom made of clay ceramics are disposed in an electrolytic bath. Alkaline ionized water produced in the electrolytic diaphragm is supplied into the electrolytic diaphragm of the adjacent electrolytic cell, and electrolyzed in the electrolytic cell. In the electrolytic diaphragm of each electrolytic cell, crystalline clay minerals are dissolved, and alkaline ionized water of high intensity is sequentially produced, and at the outside of the electrolytic diaphragm of each electrolytic cell, crystalline clay minerals are dissolved, and acidic ionized water of high intensity is sequentially produced.

9 Claims, 3 Drawing Sheets

METHOD AND APPARATUS FOR MANUFACTURING IONIZED WATER

INDUSTRIAL FIELD OF UTILIZATION

The present invention relates to an ionized water obtained by electrolysis of material water, and more particularly to an ionized water capable of maintaining a high pH value stably for a long time, and a method and apparatus for manufacturing such ionized water.

PRIOR ART

Alkaline ionized water and acidic ionized water obtained by electrolysis of water are widely used in various fields owing to their individual characteristics, and have come to be used also industrially as well as at home.

An ionized water manufacturing apparatus is usually designed to partition an electrolytic cell with porous membranes, dispose cathodes and anodes through porous membranes, and apply a direct-current voltage between cathodes and anodes. To the material water, in order to improve the conductivity, salt or other adjuvant electrolyte is added. When a voltage is applied between cathode and anode, $H^+$ ions are attracted to the cathode, and $H_2$ gas is released by the reaction with electrons in the cathode. Near the cathode, as $H^+$ ions decrease, $OH^-$ ions increase, and an acidic ionized water is produced.

Around the anode, $OH^-$ ions are attracted, and the $OH^-$ ions are deprived of electrons by the anode, and are thereby released as $O_2$ gas. As a result, around the anode, along with decrease of $OH^-$ ions, $H^+$ ions increases, and acidic ionized water is produced.

In the household manufacturing apparatus of ionized water, depending on the performance of the incorporated ion exchange resin of synthetic resin, usually acidic ionized water around pH 4.5 and alkaline ionized water around pH 9.5 are produced, but strong acidic ionized water around pH 2.5 to 3.2 or strong alkaline ionized water around pH 11.5 to 12.5 cannot be produced continuously for a long period.

Industrially, by electrolysis for about 1 hour, strong acidic ionized water of pH 3 or less, or strong alkaline ionized water at pH 12 or more can be manufactured, but the manufactured strong acidic ionized water and strong alkaline ionized water changes in pH in several hours to several days to be neutralized. As a result, to use strong acidic ionized water or strong alkaline ionized water industrially, it is necessary to install an apparatus for electrolyzing water and use directly the strong ionized water manufactured by the apparatus, and it requires a huge investment for practical use.

SUMMARY OF THE INVENTION

The invention is intended to solve such problems, and it is a primary object thereof to present ionized water of strong acidity and strong alkalinity to be favorably used in various applications, because of stable pH value for a long period. It is other object of the invention to present a method and apparatus for manufacturing ionized water capable of manufacturing easily ionized water of strong acidity and strong alkalinity stable in the pH value for a long period. It is a further object of the invention to present a method and apparatus for manufacturing ionized water capable of manufacturing strong ionized water of specific pH value continuously and stably.

The ionized water of the invention is produced by further dissolving crystalline clay minerals to alkaline and acidic ionized water obtained by electrolysis of material water in which crystalline clay minerals are dissolved, and also supplying each ionized water to the specific electrode side for electrolysis, and is characterized by maintaining a stable pH value for a long period, which achieves the above objects.

Dissolution of crystalline clay minerals and electrolysis on each ionized water obtained by electrolysis of material water are executed plural times by repetition.

A manufacturing method of ionized water of the invention comprises a first step of producing alkaline and acidic ionized water by electrolysis of material water in which crystalline clay minerals are dissolved, and a second step of further dissolving crystalline clay minerals in each obtained ionized water, and supplying each ionized water to specific electrode side respectively for electrolysis, which achieves the above objects.

The second step is repeated plural times.

A manufacturing method of ionized water of the invention, in other aspect, comprises a first step of producing alkaline and acidic ionized water by electrolysis of material water by an electrolytic cell having ceramic electrolytic diaphragms mainly composed of crystalline clay minerals, and a second step of electrolysis by supplying each obtained ionized water to specific electrode side respectively of the electrolytic cell having ceramic electrolytic diaphragms mainly composed of crystalline clay minerals, which achieves the above objects.

The second step is repeated plural times.

Moreover, a manufacturing method of ionized water of the invention comprises a first step of producing alkaline and acidic ionized water by electrolysis of material water by an electrolytic cell having an ion exchange film of synthetic resin, and ceramic granules mainly composed of crystalline clay minerals immersed in material water, and a second step of electrolysis by supplying each obtained ionized water to specific electrode side respectively of the electrolytic cell having an ion exchange film of synthetic resin, and ceramic granules mainly composed of crystalline clay minerals immersed in ionized water, which achieves the above objects.

The second step is repeated plural times.

A manufacturing apparatus of ionized water of the invention comprises an electrolytic diaphragm mainly composed of crystalline clay minerals, and plural electrolytic cells each having a pair of electrodes disposed on both sides of this electrolytic diaphragm, wherein each electrolytic cell is capable of supplying each produced ionized water of alkalinity and acidity respectively to specific electrode side across the electrolytic diaphragm in the other electrolytic cell, which achieves the above objects.

Each electrolytic cell possesses a cylindrical electrolytic diaphragm with a bottom, and a pair of cylindrical electrodes confronting on both sides of the electrolytic diaphragm, and all electrolytic cells are disposed in one electrolytic bath.

A manufacturing apparatus of ionized water of the invention also comprises an ion exchange film made of synthetic resin, and plural electrolytic cells each having a pair of electrodes disposed on both sides of this ion exchange film, and ceramic granules mainly composed of crystalline clay minerals are disposed in each electrolytic cell so as to be immersed in material water.

In a pair of electrodes of each electrolytic cell is passed a direct current obtained by full wave rectification of alternating current controlled to a specific current by a constant current circuit.

When manufacturing ionized water by electrolysis of water, theoretically, it is possible to manufacture an acidic ionized water at pH 1.0, and an alkaline ionized water at pH 14.0, and it should be possible to continue electrolysis until the treated water is lost by generation of $H_2$ gas and $O_2$ gas. Actually, however, when ionized water is manufactured by electrolysis of water, various reaction factors are complicated with each other, and if the energization time is extended or energization capacity is increased, the progress of electrolysis of water reaches the stopped saturated state. Falling in such saturated state, only $H_2$ gas and $O_2$ gas are generated wastefully, and the pH value is almost unchanged in the manufactured alkaline ionized water and acidic ionized water.

Usually, when the energization capacity reaches a specific value, the pH value of the manufactured ionized water reaches the saturated state. Therefore, if a feeble current is fed for a long time, or if a strong current is fed for a short time, as far as the energization capacity is the same, the pH of the produced alkaline ionized water and acidic ionized water is hardly different. Besides, the time-course deterioration of the pH value shows an almost same tendency.

However, by further dissolving crystalline clay minerals to the alkaline and acidic ionized water obtained by electrolysis of material water in which crystalline clay minerals are dissolved, and electrolyzing further with the alkaline ionized water and acidic ionized water respectively at the cathode side and anode side, a stable strong alkaline ionized water high in pH value and a stable strong acidic ionized water low in pH value are respectively obtained at the cathode side and anode side.

By repeating dissolution of crystalline clay minerals and electrolysis plural times on the alkaline ionized water and acidic ionized water, the alkaline ionized water comes to have a further higher pH value and the acidic ionized water, a further lower pH value. As a result, finally, an alkaline ionized water at pH 12 or more, and an acidic ionized water at pH 3 or less are produced. Moreover, the obtained alkaline ionized water and acidic ionized water are hardly changed in the time course, and the initial pH value is maintained stably for a long period. The crystalline clay minerals are formed in a thin layer state by secondary growth by bonding of tetrahedron of silicic acid and octahedron of alumina. Structurally, crystalline clay minerals are classified into 2-1 type and 1—1 type.

The crystalline clay mineral of 2-1 type represented by montmorillonite is formed by 2:1 bonding of a tetrahedron layer of silicic acid and an octahedron layer of alumina, and a pair of tetrahedron layers of silicic acid are placed from both sides of the octahedron layer of alumina. The crystalline clay mineral of 2-1 type is higher in the content of silicic acid and lower in the content of alumina, as compared with the crystalline clay mineral of 1—1 type.

Among overlapped unit layers of crystalline clay mineral of 2-1 type such as montmorillonite, water molecules, Na ions, Ca ions and other cations are invading, and generally bonding between layers is weak, and a large amount of water molecules can be aspirated between the layers.

The crystalline clay mineral of 1—1 type is formed by 1:1 bonding of tetrahedron layer of silicic acid and octahedron layer of alumina, and kaolinite and halloysite belong to the crystalline clay mineral of 1—1 type. In kaolinite, the alumina plane of basic unit layer is bonded with silicic acid plane of other basic unit layer by hydrogen bond, and groups of 0.03 to 0.05 µm are formed. In halloysite, on the other hand, one water molecule layer is present between basic unit layers, and this unit is grouped into a proper size, and the shape is varied including hollow tube, sphere, and cabbage form.

In the tetrahedron layer of silicic acid of lamellar clay mineral generally recognized, usually, one silicon ion is surrounded by four oxygen atoms, and the coordination is stable, but in the process of formation of clay mineral, its silicon ion (valence of plus 4) may be sometimes replaced by an aluminum ion (valence of plus 3). At this time, the tetrahedron layer of silicic acid comes to have one unit of negative charge ($1.6 \times 10^{-19}$ coulombs). Similarly, the aluminum ion in the octahedron of alumina may be replaced by Mg ion or Fe ion, and this octahedron of alumina also possesses one unit of negative charge. The permanent electric charge generated in such clay mineral continues to exist regardless of the ambient conditions. In particular, the montmorillonite has this property very obviously, and its charging density is a negative charge of $10^2$ units per 1 $cm^3$, and in spite of its very large charge density, its structure is stably chemically.

A pair of tetrahedrons of silicic acid or a pair of octahedrons of alumina share an oxygen atom, but at the terminal end (end face), silicon or aluminum is present only at one side, and the negative charge of oxygen is not satisfied. The clay mineral is very fine and large in specific surface area (for example, montmorillonite has a thickness of about 0.002 to 0.02 µm in the expanse of 0.1 µm class, and kaolinite has a length of 0.07 to 3.5 µm, width of 0.5 to 2.1 µm, and thickness of 0.03 to 0.05 µm), and even a trace diffuses sufficiently in water, and electric (electronic) effects are very large.

On the end face of the tetrahedron of silicic acid, a negative charge is exposed on the surface, and $H^+$ ions are weakly taken in, and an electric neutrality is maintained. This bond is, however, very weak, and although it is stable when many $H^+$ ions are present in the material water (ionized water) to be electrolyzed (acid and low in pH value), but when the pH value of the material water (ionized water) becomes large and the concentration of $OH^-$ ions is high, $H^+$ ions pop out from the tetrahedron of silicic acid accordingly, and silicic acid is charged negatively. That is, when the pH of the material water (ionized water) is larger, it tends to charge negatively, and as the pH value is smaller, it approaches the neutrality.

By contrast, the octahedron of alumina is firmly bonded with $OH^-$ ions in the state of the positive charge of aluminum exposed on the surface, and as a result, electrically, it is minus and further attracts $H^+$ ions to be charged positively. That is, through the intervening $OH^-$ ions, $H^+$ is attracted. This reaction is progressed when the $H^+$ concentration of material water becomes large (the pH value becomes lower), and it is likely to be charged positively when the pH value of the material water (ionized water) becomes lower.

Accordingly, on the end face of clay mineral, when the pH value of the water to be electrolyzed becomes higher, the negative charge ($OH^-$) increases relatively, and when the pH becomes lower, the positive charge ($H^+$) becomes dominant.

Owing to such properties, when material water (ionized water) in which crystalline clay minerals are dissolved is electrolyzed, a trace of independent matter of octahedron of alumina or independent matter of tetrahedron of silicic acid is charged according to the pH value of the material water (ionized water). In the alkaline ionized water near the cathode, the tetrahedron of silicic acid has a very high charge density if the quantity is very small, and is suspended as colloidal particles in a stable permanent charged state charged negatively. Near the cathode, as the pH value of material water (ionized water) becomes higher, the negative charging amount of the tetrahedron of silicic acid in the obtained alkaline ionized water further increases, and hence the finally obtained alkaline ionized water is high in pH value. On the other hand, $H^+$ ions generated around the cathode become, aside from those released as $H_2$ gas, hydronium ions ($H_3O^+$) stable in the covalent bonded form, fitted to the outer shell of oxygen molecule O of water molecule $H_2O$, while the tetrahedron of silicic acid suspended in the alkaline ionized water firmly holds hydronium ions ($H_3O^+$) in the surrounding, and hence it is considered that the coexisting $OH^-$ ions are stabilized. As a result, the obtained alkaline ionized water, if very high in pH value, is suppressed in the deterioration of pH value and oxidation-reduction potential (ORP), and is stable for a long period.

By contrast, near the anode, the end face of the octahedron of alumina in material water (ionized water) is positively charged to attract strongly $OH^-$ ions in water, and $H^+$ ions are considered to encourage the growth of hydronium ions ($H_3O^+$) bonded with water molecule, thereby preventing loss of $H^+$ ions. Therefore, when the pH value of the material water is low, growth of hydronium ions is encouraged, and an acidic ionized water of low pH value is obtained. Since the particle size of hydronium ions is estimated to be considerably large, the bonding force of $H^+$ ions produced in formation of hydronium ions with the water molecule is considered to be as strong as that of $K^+$ ions and $NH_4^+$ ions. As a result, the obtained acidic ionized water, if very low in pH value, is stable in the pH value and oxidation-reduction potential (ORP), and is suppressed in the deterioration of pH value and oxidation-reduction potential (ORP), and is stable for a long period.

Thus, by electrolyzing the material water in which crystalline clay minerals are dissolved, the obtained ionized water is stronger in alkalinity and acidity than the ionized water obtained by electrolysis of material water free from crystalline clay minerals, and is present in a very stable state. Moreover, by further dissolving crystalline clay minerals in thus obtained alkaline ionized water and acidic ionized water, when electrolyzed again by supplying to the cathode and anode, respectively, the alkaline ionized water formed around the cathode and the acidic ionized water formed around the anode are extremely increased in the charged amount by the massive quantity of tetrahedron of silicic acid and octahedron of alumina suspended in ionized water. As a result, the obtained alkaline ionized water or acidic ionized water has a very strong alkalinity of pH 12 or more or a very strong acidity of pH 3 or less, and is present in a very stable state electrically, so that the pH may be maintained for a long period.

The number of layers of water molecule adsorbed on the clay particles in the air dry state is said to be one or two molecule layers, but by observing the electric conductivity of the adsorbed water and morphological change of the compound, it may be interpreted that the degree of dissociation of water molecules adsorbed on clay particles is about 1,000 times higher than in ordinary water.

Water molecule cluster are dispersed in the alkaline ionized water high in pH value or acidic ionized water low in pH obtained by electrolysis. Water molecules in which cluster are dispersed have an affinity for water molecules high in the degree of dissociation, and are further considered to be hydrated in the molecular order with the tetrahedron of silicic acid or octahedron of alumina existing in water. That is, the alkaline ionized water or acidic ionized water is hardly changed in the time course although it has no strong action because many water molecules very strong in chemical reactivity are present.

A ceramic electrolytic diaphragm mainly composed of crystalline clay minerals exhibits anion exchange capacity derived from the permanent charge characteristic of lamellar clay minerals, thereby allowing passing of direct current. By this electrolytic diaphragm, crystalline clay minerals are dissolved in the material water.

By disposing plural electrolytic cells arranging a pair of cylindrical electrodes inside and outside of a circumference of the ceramic electrolytic diaphragm mainly composed of crystalline clay minerals in a cylindrical form with a bottom, in one electrolytic bath, and supplying ion liquid in the electrolytic diaphragm in each electrolytic cell into the electrolytic diaphragms of other electrolytic cell sequentially, electrolytic process can be done continuously by the individual electrolytic cells, and ionized water of high intensity is produced inside and outside of the electrolytic diaphragm electrolyzed finally.

When using the electrolytic cell having an ion exchange film of ordinary synthetic resin, without using ceramic electrolytic diaphragm mainly composed of crystalline clay minerals, by charging ceramic granules mainly composed of crystalline clay minerals in the electrolytic cells, crystalline clay minerals are dissolved in the material water (ionized water) in the electrolytic cells. As a result, by the same action as in the electrolysis by electrolytic cells having ceramic electrolytic diaphragm mainly composed of crystalline clay minerals, ionized water of high intensity is obtained.

In each electrode of each electrolytic cell, the directly current obtained by full wave rectification of alternating current at specified current is always applied by a constant current circuit. Selecting an alternating-current voltage corresponding to the change of electric resistance by chemical change of the material water (ionized water), a voltage for always obtaining a specific direct current may be applied to the electrodes. As a result, ionized water at desired pH value can be easily produced.

EMBODIMENT

Figure 1:
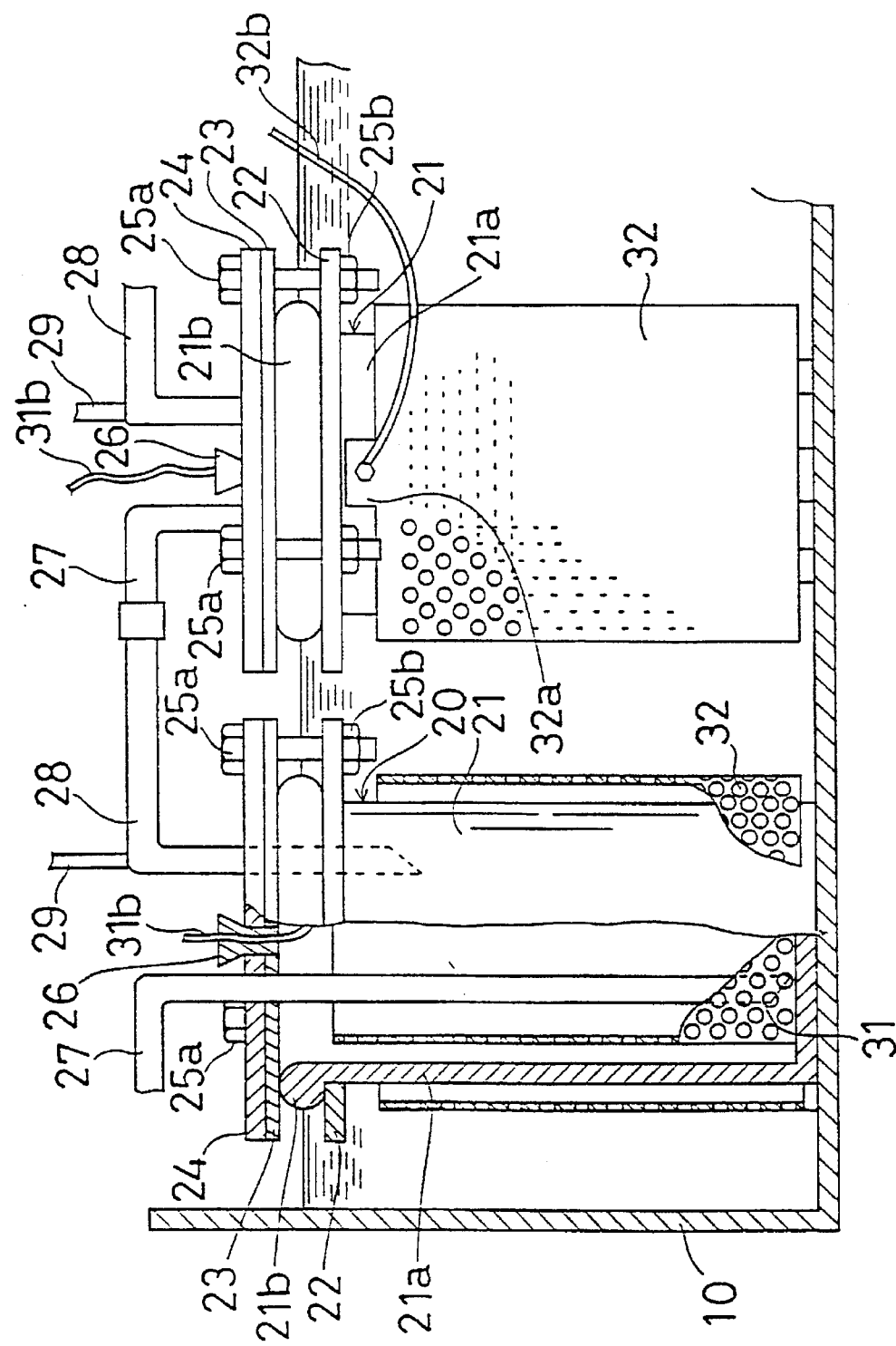
FIG. 1 is a sectional view of essential parts showing an example of manufacturing apparatus of ionized water of the invention.

Referring now to the drawings, an embodiment of the invention is described in detail below.

FIG. 1 is a sectional view showing an example of an ionized water manufacturing apparatus used in the ionized water manufacturing method of the invention.

This ionized water manufacturing apparatus comprises a plastic electrolytic bath 10, and plural cylindrical electrolytic cells 20 disposed in this electrolytic bath 10.

Figure 2:
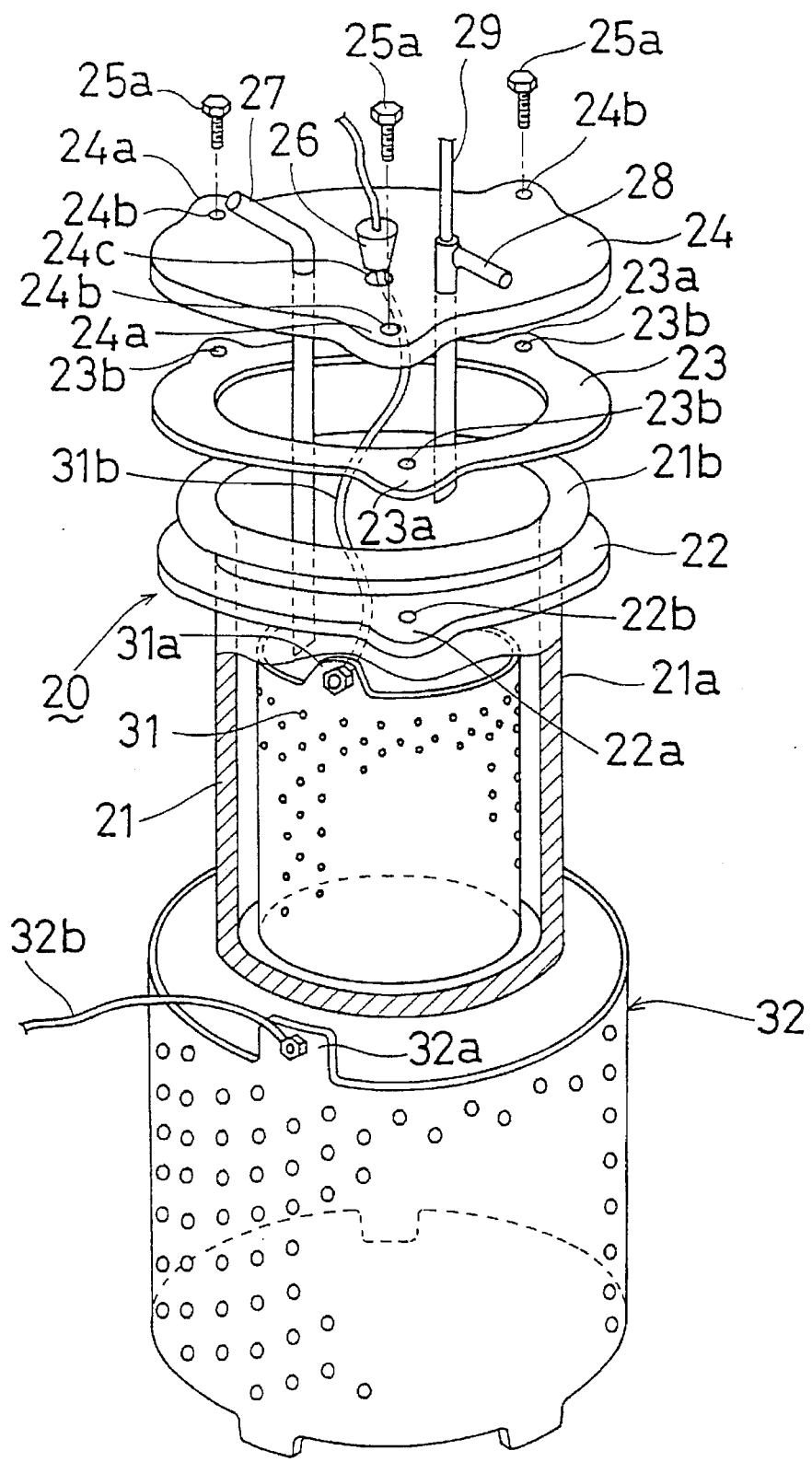
FIG. 2 is a perspective exploded view of electrolytic cell used in the manufacturing apparatus of ionized water

FIG. 2 is a perspective exploded view of the electrolytic cell 20. Each electrolytic cell 20 possesses an electrolytic diaphragm 21 mainly composed of crystalline clay minerals and constituted of clay ceramic (sinter) containing amorphous water-containing oxide. The electrolytic diaphragm 21 has a cylindrical peripheral part 21a with a bottom opened in the top and closed in the bottom, and a flange part 21b disposed so as to project outward on the upper end outer circumference of the peripheral part 21a.

Clay is the name given to soil particles of 2 μm or smaller size, and it is the stone decomposed by the dissolving action of water in a very long period into calcium (Ca), magnesium (Mg), sodium (Na), potassium (K), other bases, and after these bases, massive silicon and aluminum being dissolved and recrystallized as silicic acid ($SiO_2$) and alumina ($Al_2O_3$).

As the clay to be used in the electrolytic diaphragm 21, preferably, montmorillonite and kaolinite should be properly contained, but it is not particularly defined. When the electrolytic diaphragm 21 is thick, the current passing resistance increases, and water passing performance is impaired, and it is preferred to be 8 mm or less.

Inside the peripheral part 21a of the electrolytic diaphragm 21, a cylindrical cathode 31 is disposed in fitting state, and outside the peripheral part 21, a cylindrical anode 32 is disposed in fitting state. Therefore, the cathode 31 and anode 32 are in opposite state across the peripheral part 21a of the electrolytic diaphragm 21.

The anode 32 is disposed in concentric state with the electrolytic diaphragm 21 and cathode 31 so that the mutual interval may be as small as possible. The mutual interval of the anode 32, electrolytic diaphragm 21, and cathode 31 is closely related with the current passing resistance value, together with the thickness of the peripheral part 21a in the electrolytic diaphragm 21, and should be as small as possible so as to suppress the current passing resistance.

The cathode 31 disposed in the electrolytic diaphragm 21 is a punching metal composed of stainless steel formed cylindrically, and is disposed in a vertical state concentrically with the electrolytic diaphragm 21. Above each electrode 31, there is a lead wire terminal 31a projecting upward, and a lead wire 31b is connected to this lead wire terminal 31a.

As the cathode 31, any metal may be used because the metal used herein is not exposed to corrosion and the metal used herein will not elute into alkaline ionized water, and in this embodiment, specifically, a punching metal of stainless steel plate permissible as the electrode material in contact with food is used. Multiple perforations formed on the circumference of the cathode 31 are formed in order to improve the flow of water in the electrolytic diaphragm 21.

The anode 32 is a cylindrical form of punching metal composed of Pt-clad Ti (titanium), and is vertically disposed in the electrolytic bath 10. Above each anode 32, there is a lead wire terminal 32a projecting upward, and a lead wire 32b is connected to this lead wire terminal 32a.

In the anode 32, sine the metal used herein is dissolved, it pollutes the surrounding water of the electrolytic diaphragm 21. The metals used as electrode in electrolysis are usually easy to dissolve in the sequence of Cr>Fe>Ti>Ni>Ag>Pt, and Pt is relatively less dissolved. Therefore, in the punching metal composed of Pt-clad Ti as in this embodiment, it can be used stably for a long period. Multiple perforations formed on the circumference are provided to improve the flow of water.

Below the flange part 21b of the electrolytic diaphragm 21, a plastic stop ring 22 fitted above the peripheral part 21a is fitted. This stop ring 22 is a nearly circular flat plate having a circular penetration hole formed in the center, and base parts 22a projecting outward are formed at three positions in the peripheral direction, at equal intervals in the peripheral direction. In each base part 22a, a bolt hole 22b for penetrating the bolt 25a is formed.

On the opened upper end of the electrolytic diaphragm 21, a lid body 24 is press-fitted through a packing 23. The lid body 24 is formed almost in a circular form by a plastic plate, and base parts 24a projecting outward are formed at three positions in the peripheral direction, at equal intervals in the peripheral direction. In each base part 24a, a bolt hole 24b for penetrating the bolt 25a is formed.

The packing 23 is a rubber plate formed nearly in a circular form having a same opening as the opening of the electrolytic diaphragm 21 in the center, so as to be pressfitted to the flange part 21b of the electrolytic diaphragm 21, and base parts 23a projecting outward are formed at three positions in the peripheral direction, at equal intervals in the peripheral direction. In each base part 23a, a bolt hole 23b for penetrating the bolt 25a is formed.

The lid body 24 and packing 23 are in the state so that the base parts 24a and 23a are matched with the base parts 22a of the stop ring 22 fitted to the electrolytic diaphragm 21, and bolts 25a are inserted into bolt holes 24b, 23b, 22b of the base parts 24a, 23a, 22a, and tightened by nuts 25b (see FIG. 1). Accordingly, the lid body 24 is hermetically press-fitted to the peripheral flange part 21b of the opening of the electrolytic diaphragm 21 by means of the packing 23.

In the central part of the lid body 24, a penetration hole 24c is opened, and a rubber plug 26 is hermetically fitted into the penetration hole 24c. In the axial center of the plug 26, the lead wire 31b connected to the lead wire terminal 31a of the cathode 31 is hermetically inserted.

In the lid body 24, moreover, a feed pipe 27 and a discharge pipe 28 to be inserted into the cylindrical cathode 31 disposed in the electrolytic diaphragm 21 are inserted. The discharge pipe 28 is provided with an exhaust pipe 29 for discharging the hydrogen generated in the electrolytic diaphragm 21.

Six pieces of thus constituted electrolytic cell 20 are disposed in the electrolytic bath 10. The electrolytic cells 20 are disposed in a proper number depending on the pH value of the produced ionized water, and usually three to nine electrolytic cells 20 are disposed in the electrolytic bath 10. In the feed pipe 27 of the first electrolytic cell 20 in the electrolytic bath 10, water to be electrolyzed such as tap water is poured, and the discharge pipe 28 of this first electrolytic cell 20 is connected to a feed pipe 27 of the adjacent second electrolytic cell 20. The discharge pipe 28 of the second electrolytic cell 20 is connected to a feed pipe 27 of the adjacent third electrolytic cell 20. In this way, the feed pipe 27 of the electrolytic cell 20 in the electrolytic bath 10 is connected in series with the discharge pipe 28 of the adjacent electrolytic cell 20, and the ionized water produced in the electrolytic diaphragm 21 of the electrolytic cell 20 is sequentially supplied into the electrolytic diaphragm 21 of the adjacent electrolytic cell 20. Finally, from the discharge pipe 28 of the sixth electrolytic cell, an electrolyzed alkaline ionized water of high pH value is taken out.

The electrolytic bath 10 has a discharge port (not shown) for taking out acidic ionized water of low pH produced around the sixth electrolytic cell 20.

In thus constituted ionized water manufacturing apparatus, tap water combined with brine (concentration 10% or more) as adjuvant electrolyte is charged as material water. The material water is at a level below the lid body 24 of each electrolytic cell 20.

In such state, direct current is supplied between the anode 32 and cathode 31 of each electrolytic cell 20, and the material water such as tap water, underground water, or their filtered water is continuously supplied from the feed pipe 27 of the first electrolytic cell 20, and brine is rarely supplied.

In the material water charged into the first electrolytic cell 20, crystalline clay minerals are dissolved from the clay ceramic electrolytic diaphragm 21, and it is electrolyzed by the direct current between the cathode 31 and anode 32. The material water in which crystalline clay minerals are dissolved is promoted in increase of negative electric charge near the cathode 31, and an alkaline ionized water of a relatively high pH value is produced. Near the anode 32, increase of positive electric charge is promoted, and acidic ionized water of a relatively low pH value is produced.

In the electrolytic diaphragm 21 in the first electrolytic cell 20, material water is charged, and the alkaline ionized water produced in the electrolytic diaphragm 21 is supplied into the electrolytic diaphragm 21 sequentially from the discharge pipe 28 through the feed pipe 27 of the second electrolytic cell 20.

Near the cathode 31, $H_2$ gas is released, and the released $H_2$ gas is discharged from the exhaust pipe 29 connected to the discharge pipe 28 through the discharge pipe 28.

The acidic ionized water produced near the anode 32 of the first electrolytic cell 20 flows, and is supplied into the peripheral part of the second electrolytic cell 220.

In the alkaline ionized water supplied in the electrolytic diaphragm 21 of the second electrolytic cell 20, crystalline clay minerals are newly dissolved from the electrolytic diaphragm 21 made of clay ceramic, and a greater quantity of crystalline clay minerals is dissolved in the alkaline ionized water. Besides, in the acidic ionized water moving to the surrounding in the second electrolytic cell 20, crystalline clay minerals flowing out of the electrolytic diaphragm 21 are newly dissolved. In this way, alkaline ionized water is supplied around the cathode 31 in the electrolytic diaphragm 21, while acidic ionized water is supplied around the anode 32 outside the electrolytic diaphragm 21, and in this state electrolysis is also executed in the second electrolytic cell 20.

Around the cathode 31 of the second electrolytic cell 20, initially, an alkaline ionized water of relatively high pH value is supplied, and the increase of negative electric charge is promoted, and an alkaline ionized water of higher pH value is produced. Moreover, the produced alkaline ionized water is in a stable state electrically.

Similarly, around the anode 32, initially, an acidic ionized water of relatively low pH value is supplied, and increase of positive charge is promoted, and an acidic ionized water of lower pH value is produced. The produced acidic ionized water is in a stable state electrically.

In the third to sixth electrolytic cell 20, similarly, electrolytic process is executed, and alkaline ionized water and acidic ionized water of high intensity are sequentially produced.

Figure 3:
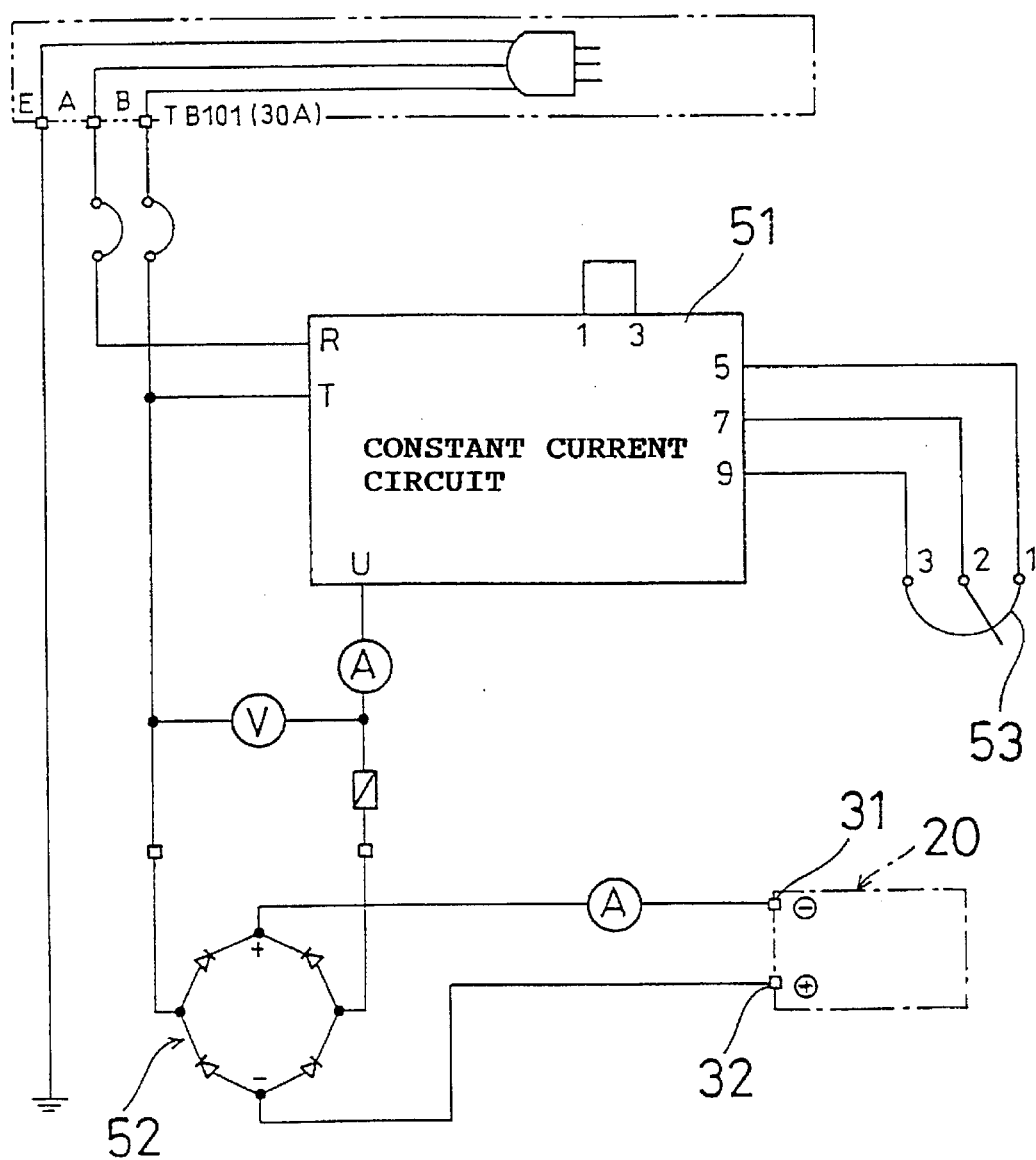
FIG. 3 is an electric circuit diagram of the manufacturing apparatus of ionized water

FIG. 3 is an electric circuit diagram of an ionized water manufacturing apparatus. In the cathode 31 and anode 32 of the ionized water manufacturing apparatus, alternating current is supplied from an alternating-current power source, and the voltage is controlled by a constant current circuit 51. The constant current circuit 51 controls to a specific current set by a dial 53, and outputs to a full-wave rectifying circuit 52 composed of four diodes. The full-wave rectifying circuit 52 rectifies the alternating current at specific current controlled by the constant current circuit 51 to a direct current, and outputs to the cathode 31 and anode 32 of each electrolytic cell 20 connected parallel.

In the embodiment, as the constant current circuit 51, a thyristor type single-layer power regulator model PAC26 of Shimaden is used.

In the electrolytic cell 20, when electrolysis of material water or ionized water is promoted, the electric resistance fluctuates, and it is not easy to supply a constant direct current always to the cathode 31 and anode 32, but by always controlling the direct current to a constant current by the constant current circuit 51, a specific direct current is supplied to all electrolytic cells 20 connected in parallel in batch, so that alkaline ionized water and acidic ionized water of specific pH value can be easily produced.

Practical examples of ionized water manufactured by using such ionized water manufacturing apparatus are shown below.

A mixed clay containing about 85% of brown forest soil, about 10% of alluvial soil, about 2% of volcanic ash deposit, and about 3% of other clay components was baked at 1025° C., and a cylindrical electrolytic diaphragm 21 of inside diameter of 120mm, thickness of 6 mm, and height of 180 mm was obtained. Using this electrolytic diaphragm 21, the electrolytic cell 20 shown in FIG. 2 was constituted, and six thereof were disposed in the electrolytic bath 10, and the ion forming apparatus shown in FIG. 1 was fabricated.

Similarly, an ion manufacturing apparatus using three electrolytic cells 20, and an ion manufacturing apparatus using nine electrolytic cells 20 were also fabricated.

Between the cathode 31 and anode 32 of each electrolytic cell 20 in each ion manufacturing apparatus, direct current was supplied for 60 minutes at an energization rate of 1.5 Ah/liter.

In the case of three electrolytic cells 20, finally, alkaline ionized water at pH 10.7 and acidic ionized water at pH 5.4 were obtained. In the case of six electrolytic cells 20, finally, alkaline ionized water at pH 12.5 and acidic ionized water at pH 2.5 were obtained. In the case of nine electrolytic cells 20, finally, alkaline ionized water and acidic ionized water at nearly same pH values as in the case of six electrolytic cells 20 were obtained.

In the case of ion manufacturing apparatus with six electrolytic cells 20, by energizing for 3 hours at an energization rate of 4.5 Ah/liter, same as in the case above, alkaline ionized water at pH about 12.5 and acidic ionized water at pH about 2.5 were obtained.

The pH value and oxidation-reduction potential (ORP) of alkaline ionized water and acidic ionized water obtained by plural times of electrolysis by plural electrolytic cells having electrolytic diaphragm of clay ceramic were measured by using pH/ORP meter model HM-14P of Toa Dempa Kogyo KK (using electrode GST-2419C for pH value, and electrode PTS- 2019 for ORP). By way of comparison, the pH value and ORP were similarly measured in alkaline ionized water and acidic ionized water obtained by using ion exchange film of synthetic resin, and, as a result, the alkaline ionized water and acidic ionized water obtained by plural times of electrolysis by plural electrolytic cells having electrolytic diaphragm of clay ceramic had the pH value of around 12, and the ORP of about −100, and the ORP was weaker than that of the alkaline ionized water and acidic ionized water obtained by electrolytic cells having ion exchange film of synthetic resin, but fluctuations of ORP value relative to the pH value were smaller, and a homogeneous ionized water was obtained. This property seems to be the effect of the trace of clay mineral molecules existing in the ionized water.

By the ion manufacturing apparatus with six electrolytic cells 20 having electrolytic diaphragm composed of clay ceramic, an alkaline ionized water was obtained by energizing for 1.2 hours at an energization rate of 1.5 Ah/liter, and time-course changes of the pH value were investigated. The alkaline ionized water had the pH of 11.5 to 12.5 (average: 12.0) at the time of manufacture, and although the pH value was slightly lowered in several days, when stored indoors at ordinary temperature, the pH was hardly changed in 6 to 24 months. The results are shown in Table 1.

TABLE 1

| Manufacture | | Inspection | |
| --- | --- | --- | --- |
| Date | pH value | Date | pH value |
| 7/19/1992 | 12.0 | 6/15/1994 | 11.7 |
| 11/18/1993 | 11.5 | 6/15/1994 | 11.3 |
| 12/1/1993 | 11.5 | 6/15/1994 | 11.3 |
| 6/10/1994 | 12.2 | 6/15/1994 | 12.0 |
| 6/13/1994 | 11.6 | 6/15/1994 | 11.5 |

In this embodiment, by using the electrolytic diaphragm composed of ceramic of crystalline clay minerals, it is designed to dissolve crystalline clay minerals in the material water or ionized water, but by charging granules composed of ceramics of crystalline clay minerals into the electrolytic cell having an ordinary ion exchange film of synthetic resin, crystalline clay minerals may be dissolved into the material water and ionized water by these granules. The electrolytic cells are connected in series, and the produced alkaline ionized water is supplied to the cathode side, and the acidic ionized water to the anode side.

In this case, too, crystalline clay minerals are dissolved in the material water and ionized water, and the ionized water electrolyzed in such state shows a strong pH value.

In such a case, too, as shown in FIG. 3, by feeding alternating current at specific current always between the cathode and anode as a direct current through the full-wave rectifying circuit, electrolysis can be executed stably.

The ionized water by the invention, in spite of strong alkalinity and strong acidity as mentioned above, maintains the same pH for a long period, and is hence used in various applications.

An alkaline ionized water at pH 10.5 or higher hardly contains metal salts, and possesses a reducing action in its wider sense of meaning, and is hence used preferably in food processing. That is, it helps to regard deterioration or discoloration caused by oxidation of food ingredients.

For example, fiber cells of vegetables, beans and cereals composed of hardly digestive cellulose can be swollen and softened. Or, by permeating among fatty ingredients in the food tissues, peroxidation of lipid can be suppressed. By expressing reducing effects on color cells in food, fading of pigments of food can be suppressed. Or, having a similar action to generation and extinction of hypochlorous acid, it is possible to impede growth of bacteria and suppress proliferation of bacteria in food.

Anyway, alkaline ionized water invades into the tissues of the object and affects its ingredients, but as the pH is lowered in the course of time, it becomes a neutral water.

The alkaline ionized water of the invention may be preferably used as various cleaning solutions. That is, since clusters of water molecules are small, the permeability and surface activity are improved, and electrons (OH⁻ ions) are present in excess, so that a cleaning power of alkaline reactivity is exhibited. By the alkaline reaction, when $OH^-$ ions decrease, it becomes a neutral water, and if used in a large quantity, it has no adverse effect on the environments. After reaction, residues derived from alkaline ionized water are not generated, and the process or operation for removing the residual matter is not needed.

As a result, the alkaline ionized water of the invention can be preferably used in all kinds of cleaning, such as household cleaning solutions for clothes, dishes, furniture, basin, toilet, windowpane, and wall, and industrial cleaning solutions for semiconductor elements, optical appliances, office automation devices, metallic machines, noble metals, spectacles, and building walls.

The acidic ionized water of the invention stably maintains a low pH value for a long period, and is expected to exhibit a bactericidal action.

Incidentally, for secure exhibition of bactericidal effect, it is known that acidic ionized water must have the pH of 3.0 or less, and ORP value of +1000 mV or more, and alkaline ionized water, pH of 12.0 or more, and ORP of −200 mV or less.

The ionized water of the invention thus maintains a strong pH value for a long period stably, and can be used preferably in various applications. For example, alkaline ionized water can be used in food processing and cleaning of various objects, and acidic ionized water can be used in disinfection. According the manufacturing method and manufacturing apparatus of ionized water of the invention, ionized water of such strong pH value can be manufactured easily and continuously.

What is claimed is:

1. A method for manufacturing ionized water comprising:
   a first step of dissolving crystalline clay minerals selected from the group consisting of montmorillonite and halloysite in water for electrolysis treatment, and
   a second step of further dissolving crystal clay minerals in alkaline ionized water and acidic ionized water obtained at the first step, and supplying respectively to the cathode side and anode side, and performing electrolysis treatment so as to produce strong alkaline and strong acidic ionized water maintaining a stable pH, respectively at the cathode side and anode side.

2. A-manufacturing method of ionized water of claim 1, wherein the second step is repeated plural times.

3. A method for manufacturing ionized water comprising:
   a first step of electrolyzing material water by an electrolytic cell possessing a ceramic electrolytic diaphragm mainly composed of crystalline clay minerals selected from the group consisting of montmorillonite and halloysite, and producing alkaline and acidic ionized water respectively at a cathode side and an anode side, and
   a second step of supplying the alkaline ionized water and acidic ionized water obtained at the first step respectively to the cathode side and anode side of the electrolytic cell possessing a ceramic electrolytic diaphragm mainly composed of crystalline clay minerals, thereby producing strong alkaline and strong acidic ionized water maintaining a stable pH, respectively at the cathode side and anode side.

4. A manufacturing method of ionized water of claim 3, wherein the second step is repeated plural times.

5. A method for manufacturing ionized water comprising:
   a first step of electrolyzing material water by an electrolytic cell possessing a synthetic resin ion exchange film, and ceramic granules mainly composed of crystalline clay minerals selected from the group consisting of montmorillonite and halloysite, and producing alkaline and acidic ionized water respectively at a cathode side and an anode side, and
   a second step of supplying the alkaline ionized water and acidic ionized water obtained at the first step respectively to the cathode side and anode side of the electrolytic cell possessing a synthetic resin ion exchange film, and ceramic granules mainly composed of crystalline clay minerals represented by montmorillonite and halloysite, thereby producing strong alkaline and strong acidic ionized water maintaining a stable pH, respectively at the cathode side and anode side.

6. A manufacturing method of ionized water of claim 5, wherein the second step is repeated plural times.

7. An apparatus for manufacturing ionized water comprising a ceramic electrolytic diaphragm mainly composed of crystalline clay minerals selected from the group consisting of montmorillonite and halloysite, and plural electrolytic cells each having a pair of cathode and anode disposed at both sides of this electrolytic diaphragm, wherein each electrolytic cell is capable of supplying the produced alkaline ionized water and acidic ionized water respectively to the cathode side and anode side disposed on both sides of the electrolytic diaphragm in other electrolytic cell.

8. A manufacturing apparatus of ionized water of claim 7, wherein each electrolytic cell possesses a cylindrical electrolytic diaphragm with a bottom, and a pair of cylindrical electrodes confronting on both sides of the electrolytic diaphragm, and all electrolytic cells are disposed in one electrolytic bath.

9. An apparatus for manufacturing ionized water comprising an ion exchange film made of synthetic resin, and plural electrolytic cells each having a pair of cathode and anode disposed on both sides of this ion exchange film, wherein each electrolytic cell is capable of supplying the produced alkaline ionized water and acidic ionized water respectively to the cathode side and anode side disposed on both sides of the electrolytic diaphragm in other electrolytic cell, and ceramic granules mainly composed of crystalline clay minerals selected from the group consisting of montmorillonite and halloysite are disposed in each electrolytic cell so as to be immersed in material water.

* * * * *